INVENTORS
FREDRICK J. SAVAGLIO
THOMAS C. WOODS
ALLAN F. PACELA

BY *A. M. Fernandez*
ATTORNEY 3,559,193
COMMON MODE SIGNAL DETECTION
Fredrick J. Savaglio, Fullerton, and Thomas C. Woods, and Allan F. Pacela, Diamond Bar, Calif., assignors to Beckman Instruments, Inc., a corporation of California
Filed Nov. 20, 1967, Ser. No. 684,406
Int. Cl. G08b 21/00; G01r 19/00; A61b 5/04
U.S. Cl. 340—213                             6 Claims

ABSTRACT OF THE DISCLOSURE

Common mode signal detection is provided in an electronic system having a differential input amplifier consisting of two active elements connected to a common constant current source by detecting a voltage produced across the constant current source in response to a common mode signal superimposed on the differential input signal. A threshold device is then employed to determine when the common mode signal exceeds a predetermined voltage level. The differential amplifier should have a common mode rejection factor sufficient to reduce unwanted differential output signals (as an equivalent differential input noise) to an amplitude not greater in order of magnitude than the input signal. An alarm system is connected to the threshold device to signal when the common mode signal exceeds the predetermined voltage level. This common mode signal detection system may be employed to particular advantage in electronic systems for monitoring biopotentials since it provides a convenient way of determining when a biopotential electrode has become detached from the subject.

---

Figure 2:
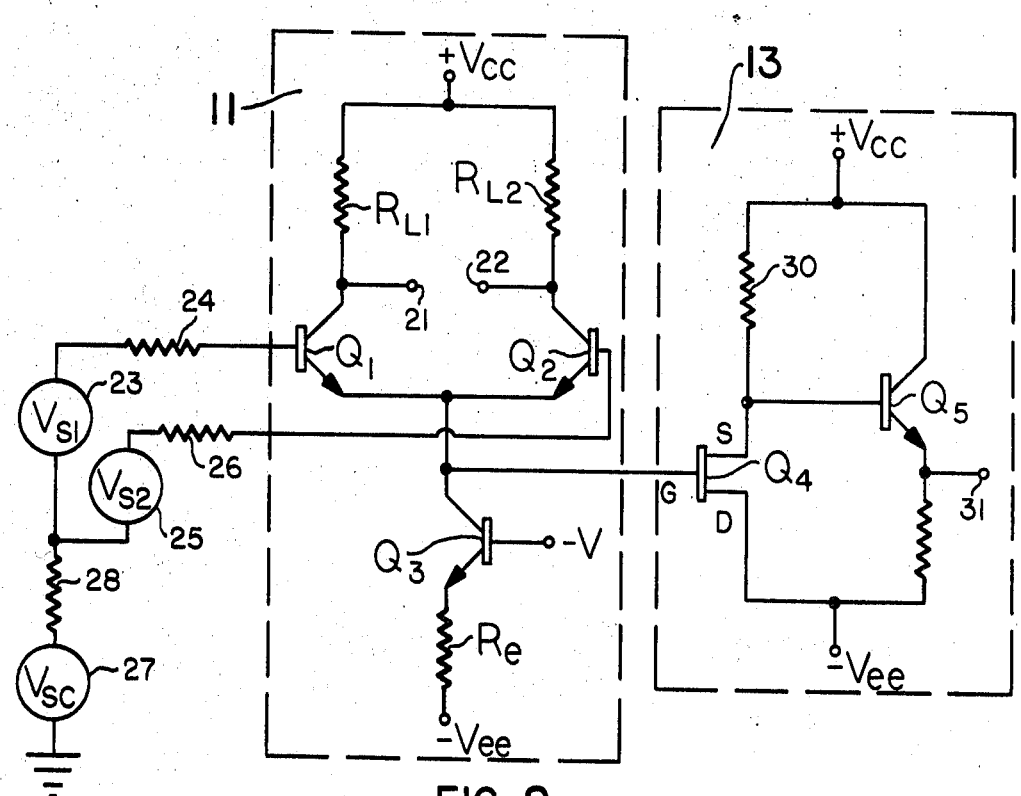

This invention relates to a common mode signal detection system for electronic apparatus, and in particular to a common mode signal detection system in an electronic biopotential monitor.

It is common practice to employ a differential amplifier as the input stage to an electronic system for monitoring low level signals, such as in industrial process control applications, and in particular in medical electronic systems used to monitor biopotentials from human or animal subjects, because of the high common mode signal rejection provided thereby. However, the common mode signal is nevertheless present and will produce at the output terminals of the differential amplifier a signal much reduced in amplitude but nevertheless equivalent to a differential input noise which may reach an amplitude as much as ten to twenty percent of the wanted differential output signal. Therefore, it would be advantageous to be able to determine when the common mode input signal has reached a predetermined level.

The connection between biopotential electrodes and a human or animal subject is in itself a great source of problems in medical electronic monitoring systems because of high common mode signals and high electrode contact impedance. The latter may be detected by monitoring the total electrode subject impedance in a manner disclosed in a copending application Ser. No. 656,805 filed July 28, 1967, and assigned to the assignee of the present invention. However, it may not always be possible or desirable to monitor the total electrode subject impedance in that manner, whereas it should always be possible and desirable to monitor the common mode signal present. Since a detached biopotential electrode may result in a high common mode signal being induced in the cable connecting the electrode to the electronic monitoring system, depending upon the environment and the nature of a grounded shield, if any, on the cable, the detachment of a biopotential electrode may be detected by monitoring the common mode signal at the input of the electronic monitoring system.

The primary object of this invention is to provide a common mode signal detection system for electronic apparatus.

A further object of this invention is to provide a means for detecting excessive common mode signals superimposed on biopotentials being monitored by an electronic system.

Still another object is to provide a system for detecting a detached biopotential electrode in an electronic system for monitoring biopotentials in a human or animal subject.

These and other objects of the invention are achieved by sensing the common mode signal at the current source of a wide-band differential input amplifier to which at least one input signal is applied and, in biopotential monitoring systems, to which two biopotential electrodes attached to a subject are connected. The sensed common mode signal is then translated by an impedance matching device to a threshold device for determining when the common mode signal exceeds a predetermined voltage level which, in the particular monitoring system, can be tolerated. The differential amplifier should have high common mode rejection, typically 60 db or more, such that below the voltage level at which the threshold device is set there will be produced at the output terminals of the differential amplifier a signal of unwanted equivalent differential input noise below the noise level which can be tolerated in the system, such as ten percent. Due to the high impedance of the constant current source, a field-effect transistor is employed to sense the common mode signal. An amplifier is employed to couple the common mode signal sensor to the threshold device. In an A.C. system having input signals to the differential amplifier capacitively coupled thereto, a filter and rectifier may be provided between the common mode voltage amplifier and the threshold device.

Figure 1:
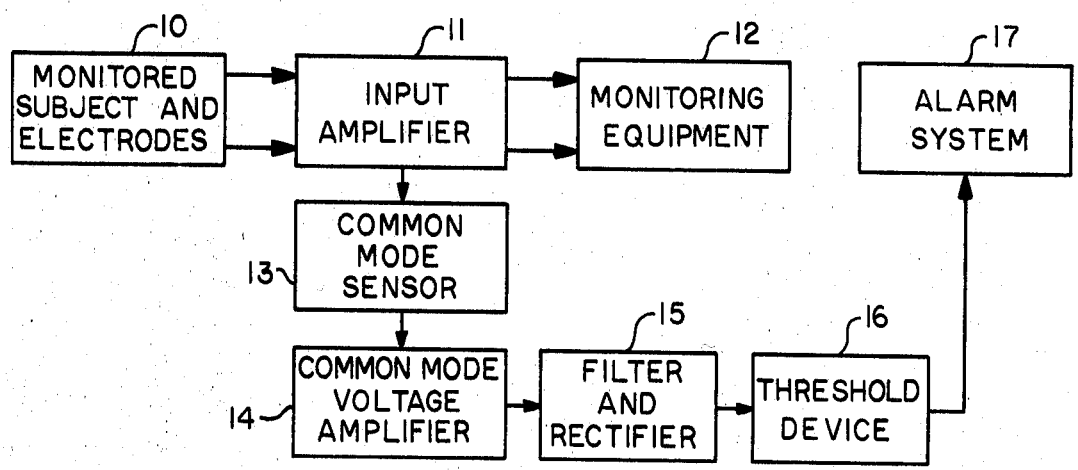

Other objects and advantages of the present invention will become apparent from the following detailed description of the invention with reference to the drawings in which:

FIG. 1 is a block diagram of an electronic biopotential monitoring system having means for detecting excessive common mode signals superimposed on the biopotentials being monitored; and FIG. 2 is a circuit diagram illustrating one embodiment of the present invention in FIG. 1.

The reliability of biopotential electrodes is of major importance in biopotential monitoring, particularly in intensive or coronary care monitoring. Electrodes can fail for many reasons: they can become detached from the subject; they can fail mechanically, resulting in an open circuit; and they can greatly increase in impedance over a period of time. In addition, environmental factors can make continuous monitoring difficult. As noted hereinbefore, in the event of an electrode failure, and sometimes even without such a failure, the presence of power frequency electrical fields in and around the monitored subject may result in excessive common mode signals which are sometimes referred to in the field of medical electronics as artifacts.

Due to the many causes of electrode failure, and the presence of artifacts, the common mode input voltage, defined as the average of the single-sided voltages present at the input of a differential amplifier should be monitored since, as noted hereinbefore, it can easily exceed the common mode tolerance of the monitoring system. Monitoring the common mode voltage is therefore useful to detect the detachment or deterioration of a biopotential electrode, or the presence of excessive artifacts due to any other cause. That is accomplished in accordance with the present invention by sensing the common mode signal at the current source of the wideband, differential amplifier.

Although the embodiment of the present invention illustrated in the drawings is for monitoring biopotentials which include all of the bioelectric phenomena present in living bodies, such as those monitored for producing an electrocardiogram, an electroencephalogram, an electromyogram, an electro-oculogram, an electroretinogram, and the like, all being potentials obtained through biopotential electrodes attached either to the body surface or subcutaneously implanted in a human or animal subject, it should be understood that in its broadest aspects, the present invention relates to a common mode signal detection system for any electronic apparatus where the common mode signal is several orders of magnitude greater than the differential of input signals to a differential amplifier. Accordingly, although the monitored subject and electrodes illustrated schematically by block 10 in FIG. 1 may be a human subject connected through biopotential electrodes to a differential input amplifier 11 of monitoring apparatus 12, such as a recorder especially adapted for providing an electrocardiogram, it should be understood that the monitored subject may be any physical system and the electrodes may be any type of transducer for producing input signals to the differential amplifier 11 in response to some physical phenomena present in the subject.

A common mode signal sensor 13 is connected to a constant current source $Q_3$ of the differential amplifier 11 as shown in FIG. 2. The output of the common mode sensor 13 is connected to an amplifier 14 having a gain of about 5 to 10.

In electronic biopotential monitoring systems it is often desirable to employ RC coupling at the input thereof in oder to isolate the subject from the electronic monitoring system and thereby prevent hazardous D.C. current from flowing through the subject in the event of a malfunction in the electronic system. However, that is not necessary, particularly since other techniques may be employed in addition to or in lieu of D.C. blocking capacitors to protect the subject from hazardous currents, such as techniques disclosed in a copending application entitled "Patient Monitoring Safety System" filed concurrently herewith.

As just noted, RC coupling is not required in the present invention, but if employed, the common mode signal sensed at the collector of the transistor $Q_3$ (which, together with its emitter resistor $R_e$ connected to a source of negative potential $-V_{ee}$ and a bias potential $-V$ applied to the base thereof, provides the requisite constant current for the differential amplifier) is essentially an A.C. signal at a frequency of 50 or 60 Hz., or some other frequency, depending upon the environment. Accordingly, a filter and rectifier 15 is provided in the illustrative embodiment of the present invention to provide a D.C. signal proportional to the amplitude of the common mode signal as an input to a threshold device 16, such as a Schmitt trigger circuit, which has applied to it a reference voltage $V_{ref}$ selected to provide the maximum level of common mode signal which may be tolerated in the system. Should excessive common mode signals be present for any reason, such as for the reason that a biopotential electrode has become detached from the subject, the output signal from the filter and rectifier 15 exceeds the reference voltage and trips the threshold device 16 the output of which in turn sounds an alarm in the form of a display or sound, or both, through an alarm system 17.

It should be understood that the differential amplifier 11 illustrated in FIG. 2 consisting of a pair of active elements (transistors $Q_1$ and $Q_2$) is exemplary, and that other active elements may be employed such as vacuum tubes, field-effect transistors, and the like, provided only that the active elements each have a voltage amplifying output electrode corresponding to the collector of a transistor, such as the drain in a field-effect transistor or plate in a vacuum tube, a current amplifying electrode corresponding to the emitter of a transistor, such as the source in a field-effect transistor or cathode in a vacuum tube, and a control electrode corresponding to the base of a transistor, such as the gate in a field-effect transistor or grid in a vacuum tube. It should be further understood that a constant current source connected to the emitters of the transistors $Q_1$ and $Q_2$ is also exemplary and that it may consist, in the simplest case, of simply a large resistor $R_e$ connected between the negative source of potential $-V_{ee}$ and the emitters of the transistor $Q_1$ and $Q_2$. Load resistors $R_{L1}$ and $R_{L2}$ are connected between a positive power supply $+V_{ee}$ and the collectors of the transistors $Q_1$ and $Q_2$ respectively. The output of the differential amplifier may be taken from either the two collectors at terminals 21 and 22 as shown or from a single collector.

The monitored subject and electrodes 10 are represented in the circuit diagram of FIG. 2 by a first voltage source 23 having a source impedance 24 and a second voltage source 25 having a source impedance 26 connected to the base electrodes of the transistors $Q_1$ and $Q_2$. The common mode signal source is represented by a voltage source 27 having a source impedance 28. Other representations of the equivalent circuit for the monitored subject and electrodes may be devised to more conveniently or more explicitly represent the biopotentials and common mode signals in the monitored subject and electrodes, but in any case what is of interest is the provision of an output signal at terminals 21 and 22 given by the following equation:

$$e_{\text{diff}} = \frac{V_{s1} - V_{s2}}{2} \times G_{\text{diff}}$$

where $G_{\text{diff}}$ is the differential gain of the stage, the amplifier is designed with typically 60 db or more of common mode rejection and $V_{s1}$ and $V_{s2}$ are the voltage signals generated by the sources 23 and 25, respectively, each including the superimposed common mode signal $V_{sc}$.

In this simplified equivalent diagram of the monitored subject and electrodes the common mode signal source 27 is shown as being in series with the biopotential sources 23 and 25. If the common mode signal source 27 is so considered to be separate and in series with both of the signal sources 23 and 25 as shown, the desired output signal $e_{\text{diff}}$ is given by the equation $$e_{\text{diff}} = \frac{(V_{sc} + V_{s1}) - (V_{sc} + V_{s2})}{2} \times G_{\text{diff}}$$

The common mode voltage $e_{cm}$ sensed at the current source is then given by the following equation:

$$e_{cm} = \frac{(V_{sc} + V_{s1}) + (V_{sc} + V_{s2})}{2} \times G_{cm}$$

where $G_{cm}$ is the common mode stage gain to the collector of $Q_3$. The biopotentials $V_{s1}$ and $V_{s2}$ are in the millivolt range while $V_{sc}$ is typically in the order of a volt. Since $G_{cm}$ is approximately unity, it can be seen that the signal sensed at the collector of the constant current source transistor $Q_3$ is substantially equal to $V_{sc}$ and may, for the purposes of this invention, be considered equal to $V_{sc}$. For instance if the differential amplifier is designed with 80 db of common mode rejection, a common mode signal $V_{sc}$ equal to 1 volt will produce 100 microvolts of unwanted or equivalent differential input noise. If the electronic biopotential monitoring system can tolerate such an equivalent differential input noise with a typical differential input signal of 1 millivolt, any common mode signal $V_{sc}$ in excess of approximately 1 volt would be an unsatisfactory condition. Accordingly, $V_{ref}$ provided for the threshold device 16 (FIG. 1) should be adjusted to determine when the common mode signal exceeds 1 volt.

The common mode sensor 13, amplifier 14 and filter and rectifier 15 may have an over-all gain of typically 7 in which case $V_{ref}$ would be set at 7 volts for a maximum tolerable common mode signal of 1 volt. A threshold device for comparing voltage signals of about 7 volts to within a few millivolts may be provided by a transistorized Schmitt trigger circuit or more simply a transistor having its base connected to the filter and rectifier 15 and its emitter biased by, for example, a Zener diode in such a manner that the base emitter junction is not sufficiently forward biased for the transistor to conduct until the common mode signal exceeds 1 volt. For instance, if the Zener diode provides 6 volts of bias and the base-emitter junction voltage drop in the transistor of the threshold device is .7 volt, an adjustment for the remaining .3 volt could be made in an attenuator at the output of the common mode voltage amplifier 14. A sensitive amplifier could then be connected to the collector of the threshold transistor to drive a suitable lamp or other alarm system including an audio alarm.

In an A.C. coupled system such as that illustrated in FIG. 2 it may be desirable to design the filter and rectifier 15 to produce a D.C. voltage proportional to the peak magnitude of the A.C. common mode signal instead of a D.C. voltage proportional to the RMS of the common mode signal. A simple network for such a peak detecting filter and rectifier may consist of a coupling capacitor in series with a diode and an integrating capacitor connected to the output of the series diode. A high impedance typically in the order of 100 kilo ohms for a common mode signal of the order of 50 to 60 Hz. is then connected in parallel with the integrating capacitor. In that manner, the integrating capacitor charges to a value proportional to the peak amplitude of the common mode signal in response to half cycles of one polarity. The half cycles of the other polarity may be shunted by another diode connected to a junction between the coupling capacitor and the series connected diode. For the simple threshold device of the type just described consisting of a transistor with a Zener diode or other suitable bias in the emitter circuit thereof, the output of the peak detecting filter and rectifier taken directly from the integrating capacitor may be connected directly to the base electrode of the threshold transistor.

As noted hereinbefore, due to the high source impedance at the point where the common mode signal is sensed in the current source, a field-effect transistor is employed in the common mode signal sensor 13. The output from the field-effect transistor $Q_4$ is taken from its source electrode across a resistor 30 to drive a transistor $Q_5$. In that manner, the common mode signal may be sensed at the current source without degrading the performance of the differential amplifier by placing a low impedance load in parallel with the current source. In other words, the high input impedance of the field-effect transistor $Q_4$ equals or exceeds (and in the preferred embodiment greatly exceeds) the high impedance of the constant current source. This is important because the common mode rejection of the differential amplifier is dependent upon the total impedance between the collector of the transistor $Q_3$ and ground, where ground is the potential to which the common mode voltage signal $V_{sc}$ is referenced.

The transistor $Q_5$ is connected as an emitter-follower to provide a very low output impedance suitable for driving most transistor amplifier types, such as a pair of cascaded transistor stages, each connected in a grounded emitter configuration. Thus the combination of the field-effect transistor $Q_4$ and the emitter-follower transistor $Q_5$ provides a good impedance transformation to couple the common mode signal from the high impedance constant current source of the differential amplifier to an output terminal 31 connected to the amplifier 14 having a low input impedance. The combination does not offer voltage gain but the power gain can be quite high since the field-effect transistor $Q_4$ requires only nanoamperes of input to its gate terminal.

If the amplifier 14 is designed with a high input impedance, the common mode signal sensor 13 may consist of simply a low impedance direct current connection from the constant current source of the differential input amplifier to the input terminal of the common mode signal voltage amplifier 14. In either case, the output of the common mode signal sensor 13 is substantially equal to the common mode source voltage $V_{sc}$.

From the foregoing detailed description of the present invention it may be readily appreciated that a major advantage is the ability to sense the common mode signal without degrading the operation of the input differential amplifier.

While the principles of the invention have now been made clear in an illustrative embodiment, there will be immediately obvious to those skilled in the art many modifications which are particularly adapted for specific environments and operating requirements, without departing from those principles. The appended claims are therefore intended to cover and embrace any such modifications, within the limits only of the true spirit and scope of the invention.

What is claimed is:

1. A common mode signal detection system for electronic apparatus comprising:
    a differential amplifier having a pair of active elements, each element having a voltage amplifying output electrode, a control electrode, and a current amplifying electrode, both current amplifying electrodes being connected together;
    current source means connected to said current amplifying electrodes for supplying a constant current to said differential amplifier; and
    a high input impedance amplifier having an input terminal and an output terminal, said input terminal being connected to said current amplifying electrodes for amplifying a voltage produced at said current amplifying electrodes in response to a common mode signal superimposed on said differential input signal.

2. A common mode signal detection system as defined in claim 1 further including a threshold device having an input terminal and an output terminal, said input terminal being connected to said output terminal of said high input impedance amplifier for determining when said common mode signal exceeds a predetermined voltage level.

3. A common mode signal detection system as defined in claim 2 further including alarm means connected to said output terminal of said threshold device for providing an alarm indication in response to said common mode signal exceeding said predetermined voltage level.

4. In an electronic system for monitoring biopotentials between two electrodes attached to a subject wherein excessive common mode signals become superimposed on the biopotentials being monitored when the electrodes become detached from the subject, the improvement comprising:
    a differential amplifier having a pair of active elements, each element having a voltage amplifying output electrode, a control electrode, and a current amplifying electrode, both control electrodes being connected to separate biopotential electrodes attached to a subject, and both current amplifying electrodes being connected together;
    current source means connected to the current amplifying electrodes for supplying a constant current to said differential amplifier; and
    a high input impedance amplifier having an input terminal and an output terminal, said input terminal being connected to said current amplifying electrodes for amplifying a voltage produced at said current amplifying electrodes in response to a common mode signal superimposed on said differential input signal.

5. In an electronic system for monitoring biopotentials between two electrodes attached to a subject, the combination as defined in claim 4 further including a threshold device having an input terminal and an output terminal, said input terminal being connected to said output terminal of said high input impedance amplifier for determining when said common mode signal exceeds a predetermined voltage level.

6. In an electronic system for monitoring biopotentials between two electrodes attached to a subject, the combination as defined in claim 5 further including alarm means connected to said threshold device output terminal for providing an alarm indication in response to said common mode signal exceeding said predetermined voltage level.

References Cited

UNITED STATES PATENTS

| | | | |
|---|---|---|---|
| 2,824,296 | 2/1958 | Hecht et al. | 330—2X |
| 3,212,496 | 10/1965 | Preston | 128—2.06 |
| 3,262,066 | 7/1966 | Trilling | 330—30X |
| 3,394,316 | 7/1968 | Larson | 330—30 |
| 3,467,908 | 9/1969 | Burwen | 330—30X |

THOMAS B. HABECKER, Primary Examiner

P. PALAN, Assistant Examiner

U.S. Cl. X.R.

330—2, 30; 128—2.06